US012703282B2

(12) United States Patent
Yasuda et al.

(10) Patent No.: US 12,703,282 B2
(45) Date of Patent: Aug. 11, 2026

(54) SEATBACK PAD AND VEHICLE SEAT

(71) Applicants: NHK SPRING CO., LTD., Yokohama (JP); SUBARU CORPORATION, Tokyo (JP)

(72) Inventors: Kenzo Yasuda, Yokohama (JP); Yosuke Ishiyama, Tokyo (JP); Masato Fukushima, Tokyo (JP); Shumpei Nakamura, Tokyo (JP)

(73) Assignees: NHK SPRING CO., LTD., Yokohama (JP); SUBARU CORPORATION, Tokyo (JP)

( * ) Notice: Subject to any disclaimer, the term of this patent is extended or adjusted under 35 U.S.C. 154(b) by 113 days.

(21) Appl. No.: 18/757,063

(22) Filed: Jun. 27, 2024

(65) Prior Publication Data

US 2025/0010775 A1 Jan. 9, 2025

(30) Foreign Application Priority Data

Jul. 7, 2023 (JP) ................................ 2023-112618

(51) Int. Cl.
*B60N 2/66* (2006.01)
*B60N 2/64* (2006.01)

(52) U.S. Cl.
CPC ............ *B60N 2/667* (2015.04); *B60N 2/646* (2013.01); *B60N 2/666* (2015.04); *B60N 2/6671* (2015.04)

(58) Field of Classification Search
CPC ........ B60N 2/667; B60N 2/646; B60N 2/666; B60N 2/6671; B60N 2/64; B60N 2/66; A47C 7/462
USPC ................................ 297/284.4, 284.8, 452.3
See application file for complete search history.

(56) References Cited

U.S. PATENT DOCUMENTS

| | | | | |
|---|---|---|---|---|
| 3,596,990 A * | 8/1971 | Gottfried | A61G 5/00 | 297/284.8 |
| 3,833,260 A * | 9/1974 | Harder, Jr. | A47C 7/18 | 297/452.37 |
| 4,601,514 A * | 7/1986 | Meiller | A47C 7/462 | 297/284.4 |
| 4,793,574 A * | 12/1988 | Fenske | B64D 11/0649 | 297/DIG. 5 |
| 5,174,526 A * | 12/1992 | Kanigowski | B60N 2/6671 | 297/284.4 |
| 6,616,228 B2 * | 9/2003 | Heidmann | A47C 7/462 | 297/284.4 |
| 7,032,971 B2 * | 4/2006 | Williams | A47C 7/405 | 297/DIG. 2 |
| 7,237,841 B2 * | 7/2007 | Norman | A47C 7/46 | 297/301.3 |

(Continued)

FOREIGN PATENT DOCUMENTS

| | | | |
|---|---|---|---|
| JP | S59-132557 | 9/1984 | |
| JP | S63-42258 | 3/1988 | |
| JP | 2008126881 A * | 6/2008 | B60N 2/58 |

*Primary Examiner* — Robert Canfield
(74) *Attorney, Agent, or Firm* — Knobbe, Martens, Olson & Bear, LLP

(57) ABSTRACT

A seatback pad that configures a pad member of a seatback of a vehicle seat and that is covered by a cover. The seatback pad includes plural grooves that extend along a seat left-right direction formed at a lower portion of a back face of the seatback pad facing toward a lumber support device installed at the seatback, with the plural grooves being formed in a row along a seat up-down direction.

3 Claims, 7 Drawing Sheets

(56) References Cited

U.S. PATENT DOCUMENTS

| | | | | |
|---|---|---|---|---|
| 7,458,637 | B2 * | 12/2008 | Norman | A47C 7/46 297/284.4 |
| 8,668,266 | B2 * | 3/2014 | Jaranson | B60N 2/6673 297/284.4 |
| 8,944,515 | B2 * | 2/2015 | Kono | B60N 2/7017 297/452.59 |
| 10,322,656 | B2 * | 6/2019 | Pitcole | B60N 3/004 |
| 2002/0195853 | A1 * | 12/2002 | Heidmann | A47C 7/462 297/284.4 |
| 2004/0124679 | A1 * | 7/2004 | Teppo | A47C 7/462 297/284.4 |
| 2005/0275263 | A1 * | 12/2005 | Norman | A47C 7/467 297/284.4 |
| 2005/0275264 | A1 * | 12/2005 | Norman | B60N 2/66 297/284.4 |
| 2015/0021966 | A1 * | 1/2015 | Brncick | B60N 2/2231 297/284.4 |
| 2018/0022252 | A1 * | 1/2018 | Arata | B60N 2/5642 297/452.42 |

* cited by examiner

SEATBACK PAD AND VEHICLE SEAT

CROSS-REFERENCE TO RELATED APPLICATION

This application is based on and claims priority under 35 USC 119 from Japanese Patent Application No. 2023-112618 filed on Jul. 7, 2023, the disclosure of which is incorporated by reference herein.

BACKGROUND

Technical Field

The present disclosure relates to vehicle seat, and in particular relates to a seatback pad that is a pad member of a seatback.

Related Art

A vehicle seat with a lumbar support device installed at a seatback is disclosed in Japanese Utility Model Application Laid-Open (JPU) Nos. S64-15556, S63-42258, and S59-132557. The seatback includes a seatback pad that is a pad member, and a cover that covers the seatback pad. The lumbar support device is disposed at a seat rear side with respect to the seatback pad, and adjusts support force to a lumbar region of an occupant by pushing out a lower portion of the seatback pad in a seat forward direction. This thereby enables occupant comfort to be raised irrespective of differences in occupant build.

SUMMARY

There are issues with the above related art in that the seatback pad and cover act as resistance, and narrow the operational range of the lumbar support device. In particular, it is difficult to lower a support position of the lumbar region of the occupant sufficiently due to a deformational resistance of the cover being large at a lower end portion side of the seatback.

In consideration of the above circumstances, an object of the present disclosure is to obtain a seatback pad and a vehicle seat that are capable of broadening an operational range of a lumbar support device.

A seatback pad of a first aspect of the present disclosure is a seatback pad that configures a pad member of a seatback of a vehicle seat and that is covered by a cover. The seatback pad includes plural grooves that extend along a seat left-right direction formed at a lower portion of a back face of the seatback pad facing toward a lumbar support device installed at the seatback, with the plural grooves being formed in a row along a seat up-down direction.

The seatback pad of the first aspect configures the pad member of the seatback of the vehicle seat and is covered by the cover. In this seatback pad, plural grooves that extend along the seat left-right direction are formed at the lower portion of the back face of the seatback pad facing toward the lumbar support device installed at the seatback, with the plural grooves being formed in a row along the seat up-down direction. The deformation resistance of the seatback pad is accordingly smaller during operation of the lumbar support device, enabling the operational range of the lumbar support device to be broadened.

A seatback pad of a second aspect is the first aspect, wherein a seat up-down direction width of each of the plural grooves widens on progression toward a seat rear side.

In the second aspect, the seat up-down direction width of each of the plural grooves formed in the lower portion of the back face of the seatback pad widens on progression toward the seat rear side. This means that the plural grooves are not liable to close up when the lower portion of the seatback pad is pushed out greatly toward the seat front side by the lumbar support device. As a result thereof, an advantageous effect of decreasing the deformation resistance of the seatback pad is easily maintained.

A seatback pad of a third aspect is the first aspect or the second aspect, further including a pad main body section disposed at a seat left-right direction central portion of the seatback, left and right pad side sections disposed at the two seat left-right direction side portions of the seatback, and left and right indentations that are indented toward a seat front side and that are formed in two seat left-right direction end portions of the lower portion of the back face of the pad main body section. The plural grooves are formed in the lower portion of the back face of the pad main body section with two seat left-right direction end portions of the plural grooves opening onto the left and right indentations.

The seatback pad of the third aspect includes the pad main body section disposed at a seat left-right direction central portion of the seatback, and the left and right pad side sections disposed at the two seat left-right direction side portions of the seatback. The left and right indentations that are indented toward the seat front side are formed in the two seat left-right direction end portions of the lower portion of the back face of the pad main body section. The plural grooves are formed in the lower portion of the back face of the pad main body section with the two seat left-right direction end portions opening onto the left and right indentations. This means that the deformation resistance of the pad main body section when the lower portion of the pad main body section has been pushed out toward the seat front side by the lumbar support device can be made smaller as far across as the two seat left-right direction end portions of the pad main body section.

A vehicle seat of a fourth aspect includes a seat cushion that is sat on by an occupant of a vehicle, a seatback that supports a back of the occupant, and a lumbar support device installed at the seatback. A pad member of the seatback is configured by the seatback pad of any one of the first aspect to the third aspect.

In the vehicle seat of the fourth aspect, the vehicle occupant sits on the seat cushion, and the back of the occupant is supported by the seatback. The lumbar support device is installed at the seatback. The pad member of the seatback is configured by the seatback pad of any one of the first aspect to the third aspect, and so the advantageous effects listed above are obtained.

As described above, the seatback pad and the vehicle seat according to the present disclosure are able to broaden an operational range of a lumbar support device.

BRIEF DESCRIPTION OF THE DRAWINGS

Exemplary embodiments of the present invention will be described in detail based on the following figures, wherein.

DETAILED DESCRIPTION

Figure 1:
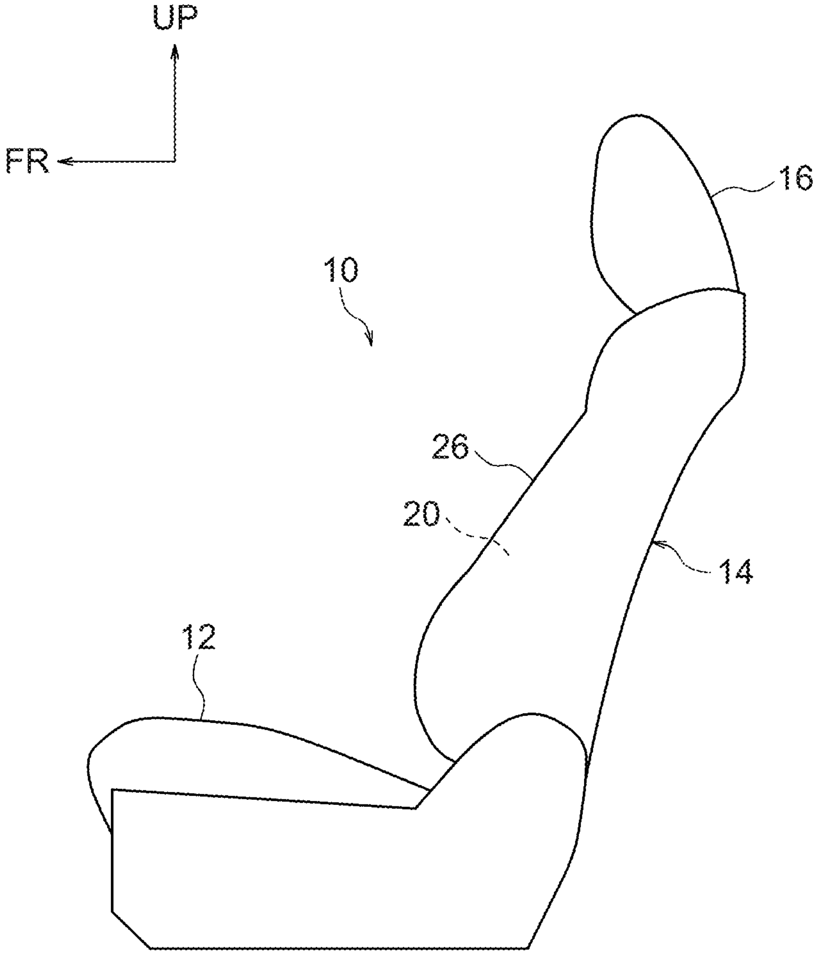
FIG. 1 is a side view illustrating a vehicle seat according to an exemplary embodiment.

Description follows regarding a vehicle seat 10 according to an exemplary embodiment of the present disclosure, with reference to FIG. 1 to FIG. 7. Note that sometimes reference numerals of some portions are omitted in the drawings in order to facilitate looking at the drawings. Note that as appropriate in the drawings, arrows FR, LH, UP respectively indicate forward, leftward, and upward directions of the vehicle seat 10. When in the following reference is simply made to front and rear, left and right, and up and down directions, then these indicate directions with respect to the vehicle seat 10.

As illustrated in FIG. 1, the vehicle seat 10 according to the present exemplary embodiment includes a seat cushion 12 that is sat on by an occupant of a vehicle, a seatback 14 that supports the back of the occupant, and a headrest 16 that supports the head of the occupant. The seatback 14 includes a non-illustrated frame that is framework member, a seatback pad 20 (see FIG. 2) that is a pad member installed at the frame, a seatback cover 26 that is a cover covering the seatback pad 20, a non-illustrated seatback spring (resilient body) for resiliently supporting the seatback pad 20 from the rear, and a lumbar support device 28 that is attached to the seatback spring.

Figure 2:
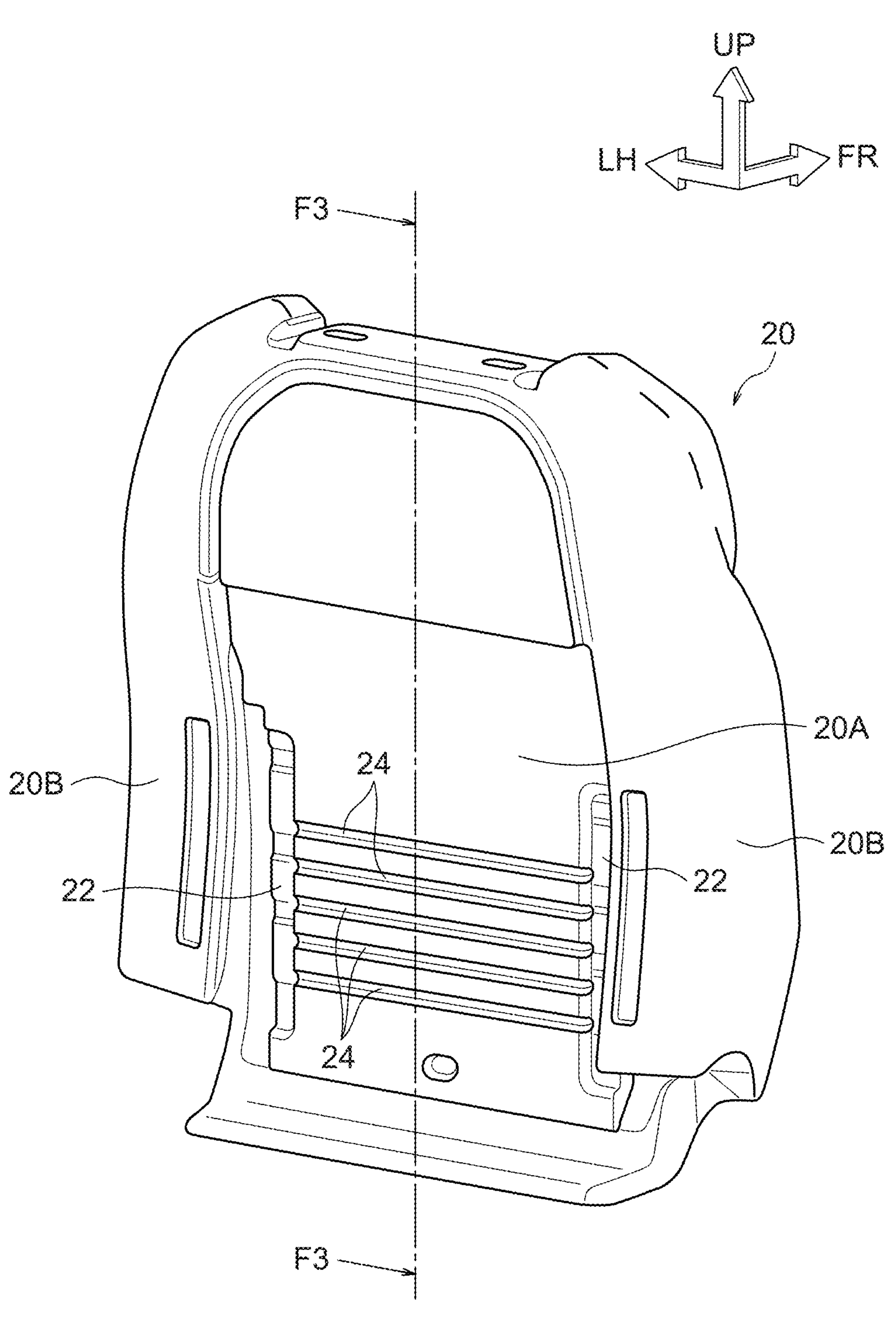
FIG. 2 is a perspective view illustrating a seatback pad of a vehicle seat according to an exemplary embodiment.

The seatback pad 20 is configured, for example, from a foam body, such as urethane foam or the like. The seatback pad 20 includes, as illustrated in FIG. 2, a pad main body section 20A disposed at a left-right direction central portion of the seatback 14, and left and right pad side sections 20B disposed at the two left-right direction sides of the seatback 14. The seatback pad 20 is entirely enclosed by the seatback cover 26.

Figure 3:
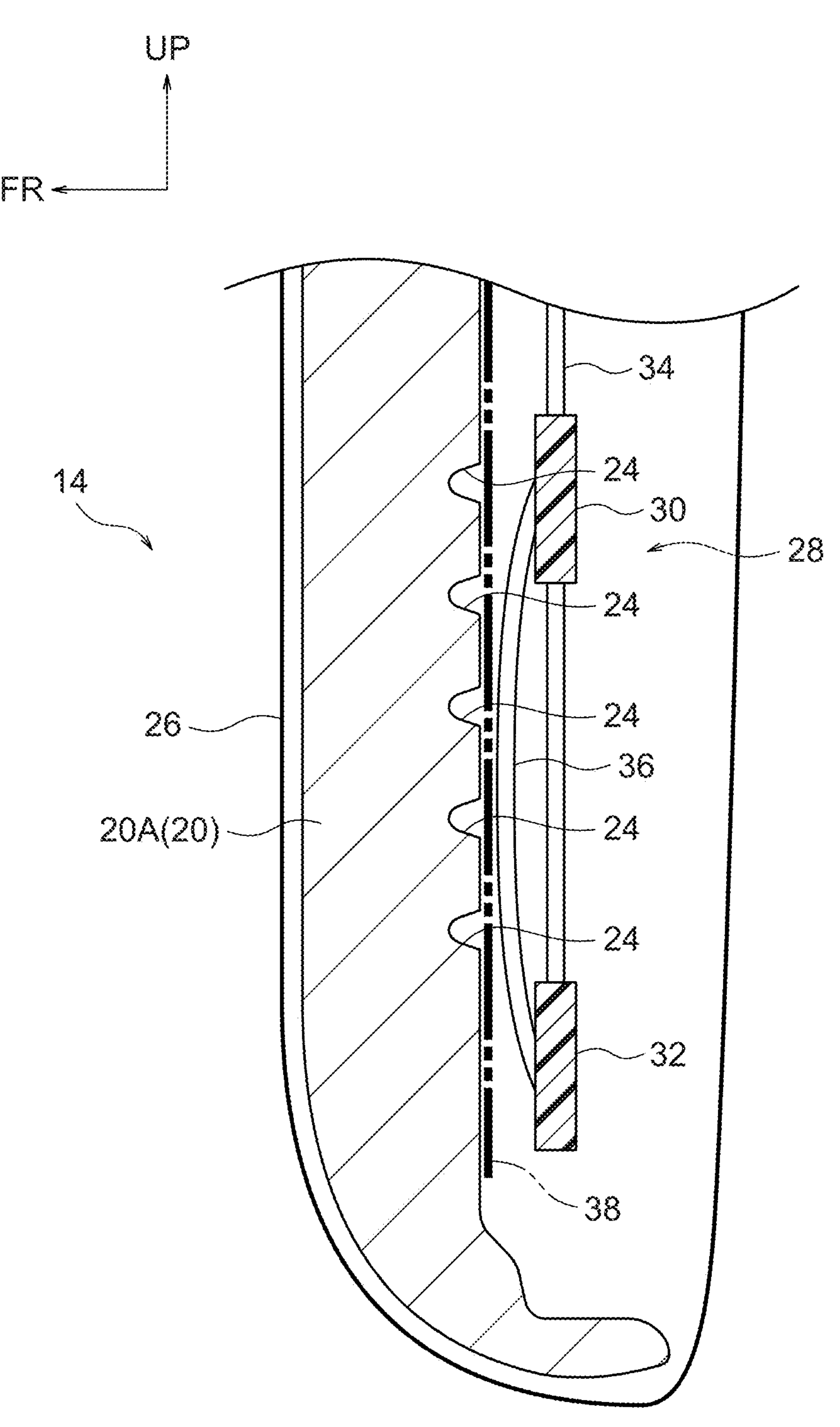
FIG. 3 is a vertical cross-section of a seatback pad according to an exemplary embodiment, and is a diagram corresponding to a section taken along line F3-F3 of FIG. 2.
Figure 4:
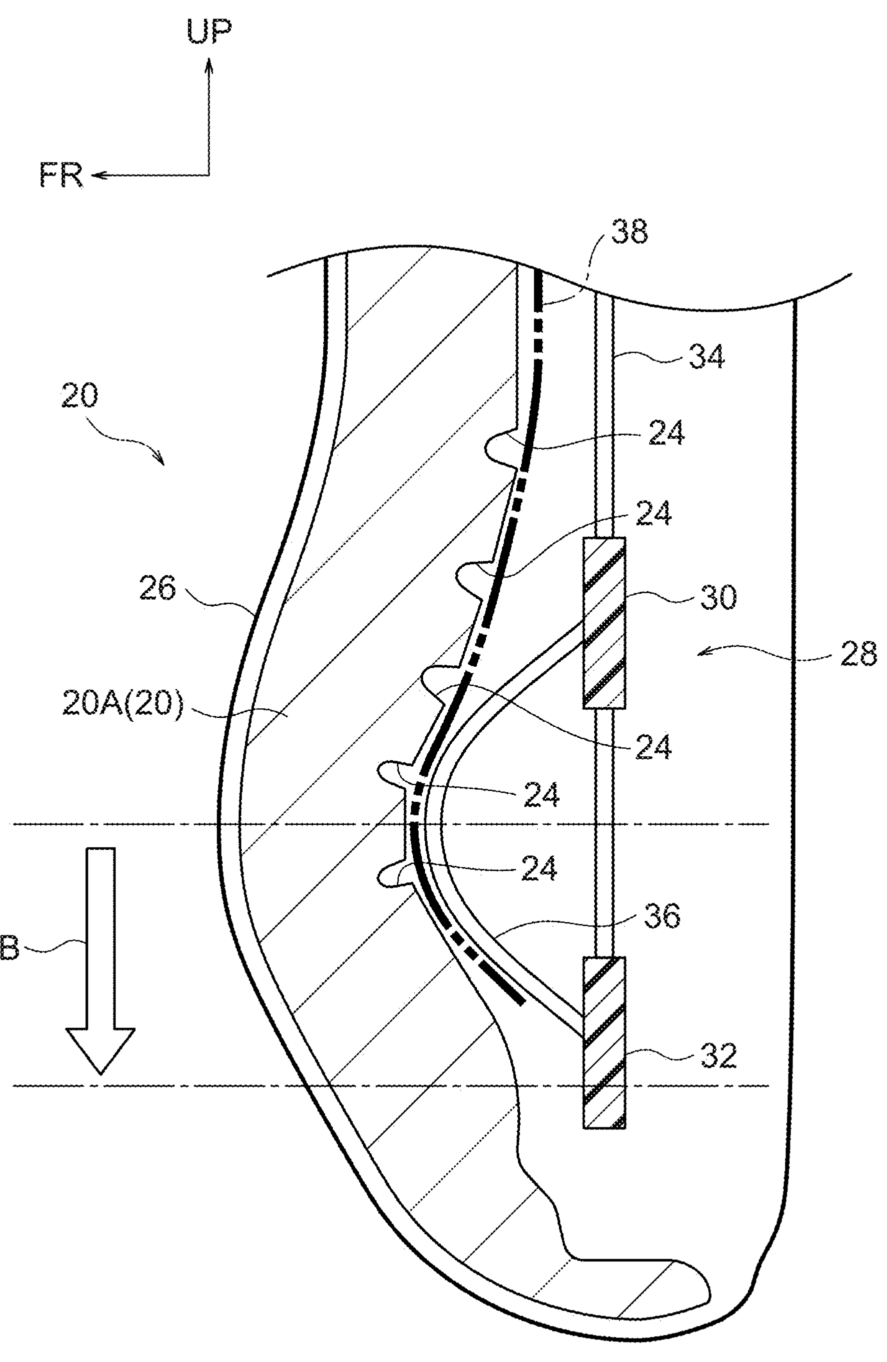
FIG. 4 is a cross-section corresponding to FIG. 3 illustrating a lower portion of a seatback pad according to an exemplary embodiment in a state pushed out by a lumbar support device.

Left and right indentations 22 that are indented toward the front side are formed at the two left-right direction end portions of a lower portion of a back face of the pad main body section 20A. Moreover, plural (in this cases five) grooves 24 extending in the left-right direction are formed in the lower portion of the back face of the pad main body section 20A, with the plural grooves 24 being formed so as to be substantially evenly spaced in a row along the up-down direction. The two left-right direction end portions of the plural grooves 24 open onto the left and right indentations 22 (are in communication with the left and right indentations 22). Moreover as illustrated in FIG. 3, the plural grooves 24 each widen in up-down direction width (groove width) on progression toward the rear side, so as to be formed with substantially wedge shaped profiles when viewed along the left-right direction.

The plural grooves 24 face toward the lumbar support device 28 disposed at the rear of the pad main body section 20A. The lumbar support device 28 includes an upper raising/lowering section 30 disposed at an up-down direction intermediate portion of the seatback 14, and a lower raising/lowering section 32 disposed at a lower end portion of the seatback 14. The two left-right end portions of the upper raising/lowering section 30 and the lower raising/lowering section 32 are respectively slidably engaged with a left-right pair of guide wires 34 (the left guide wire 34 is omitted in the drawings). The left and right guide wires 34 are supported by a frame of the seatback 14.

A left-right pair of arch formed portions 36 span between the upper raising/lowering section 30 and the lower raising/lowering section 32. The left and right arch formed portions 36 are configured from a resilient strip shaped metal plate or resin plate having a length direction along the up-down direction, bent in a circular arc shape convex on the front side when viewed along the left-right direction. The upper raising/lowering section 30, the lower raising/lowering section 32, and the left and right arch formed portions 36 are configured so as to be able to be raised or lowered as a single unit in the up-down direction by a non-illustrated raising/lowering mechanism provided to the lumbar support device 28. The raising/lowering mechanism is, for example, a screw feed mechanism.

Moreover, the upper raising/lowering section 30 and the lower raising/lowering section 32 are configured so as to be able to be moved uncoupled from each other in the up-down direction by a non-illustrated arch deformation mechanism provided to the lumbar support device 28. This arch deformation mechanism is, for example, a screw feed mechanism configured such that when operated the upper raising/lowering section 30 is moved uncoupled with respect to the lower raising/lowering section 32. The curvature of bend of the left and right arch formed portions 36 becomes tighter as the upper raising/lowering section 30 approaches the lower raising/lowering section 32, and up-down direction intermediate portions of the arch formed portions 36 protrude toward the front side. This means that a lower portion of the pad main body section 20A is pushed out forward together with the seatback cover 26. The curvature of bend in the left and right arch formed portions 36 becomes less as the upper raising/lowering section 30 separates away from the lower raising/lowering section 32, and the up-down direction intermediate portions of the left and right arch formed portions 36 retreat toward the rear side. The pad main body section 20A and the seatback cover 26 are thereby configured so as to resiliently recover to their original states. Note that a resin plate member 38 called a basket or the like is interposed between the left and right arch formed portions 36 and the pad main body section 20A.

Next, description follows regarding the operation and advantageous effects of the present exemplary embodiment.

In the vehicle seat 10 configured as described above, the seatback pad 20 configuring the pad member of the seatback 14 is covered by the seatback cover 26. The plural grooves 24 extending along the left-right direction are formed at the seatback pad 20 at the lower portion of the back face thereof facing the lumbar support device 28 installed at the seatback 14, with the plural grooves 24 being formed in a row along the up-down direction. This means that deformation resistance of the seatback pad 20 is smaller during operation of the lumbar support device 28, and the operational range of the lumbar support device 28 can be broadened.

Figure 5:
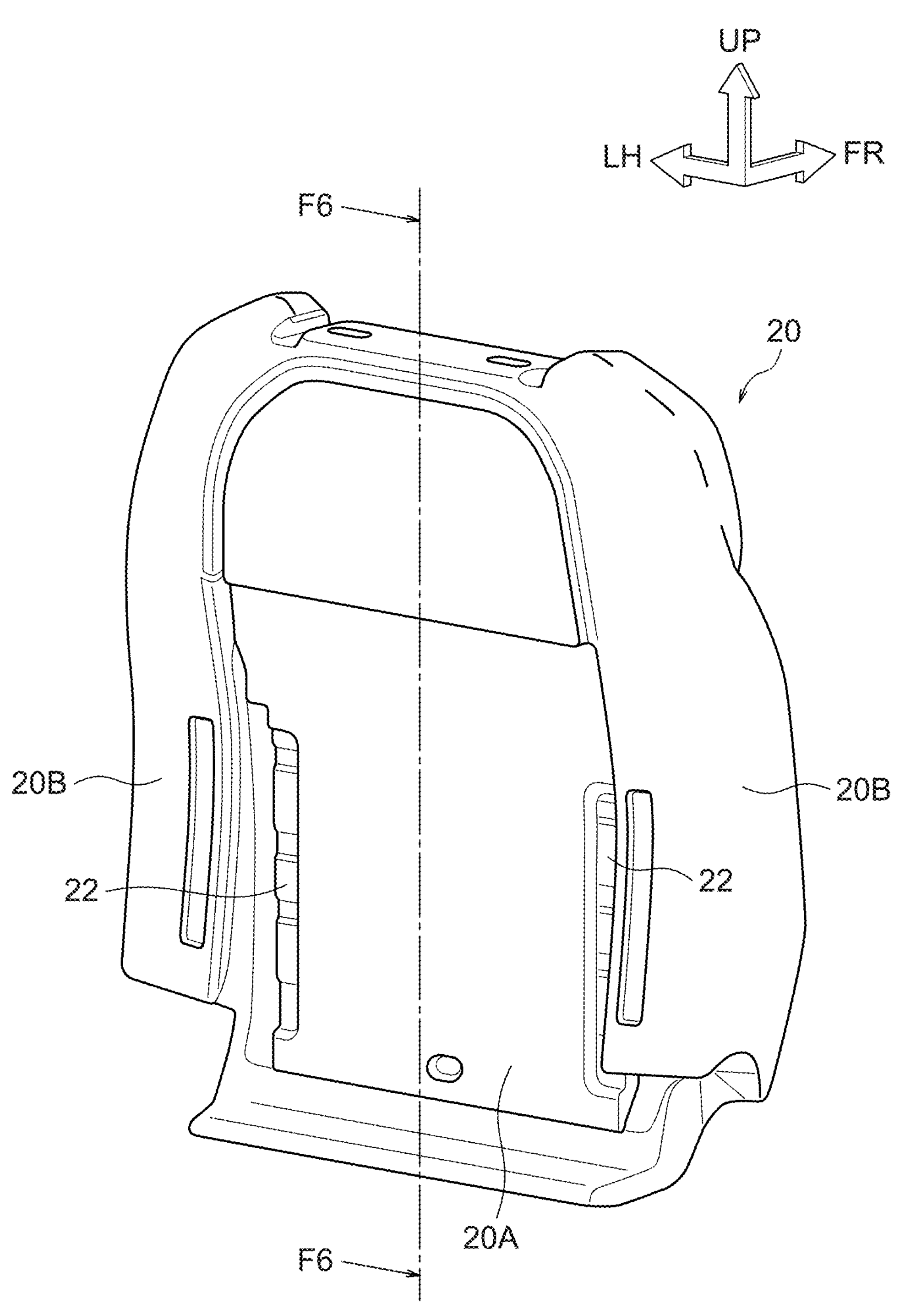
FIG. 5 is a perspective view illustrating a seatback pad of a vehicle seat according to a comparative example.
Figure 6:
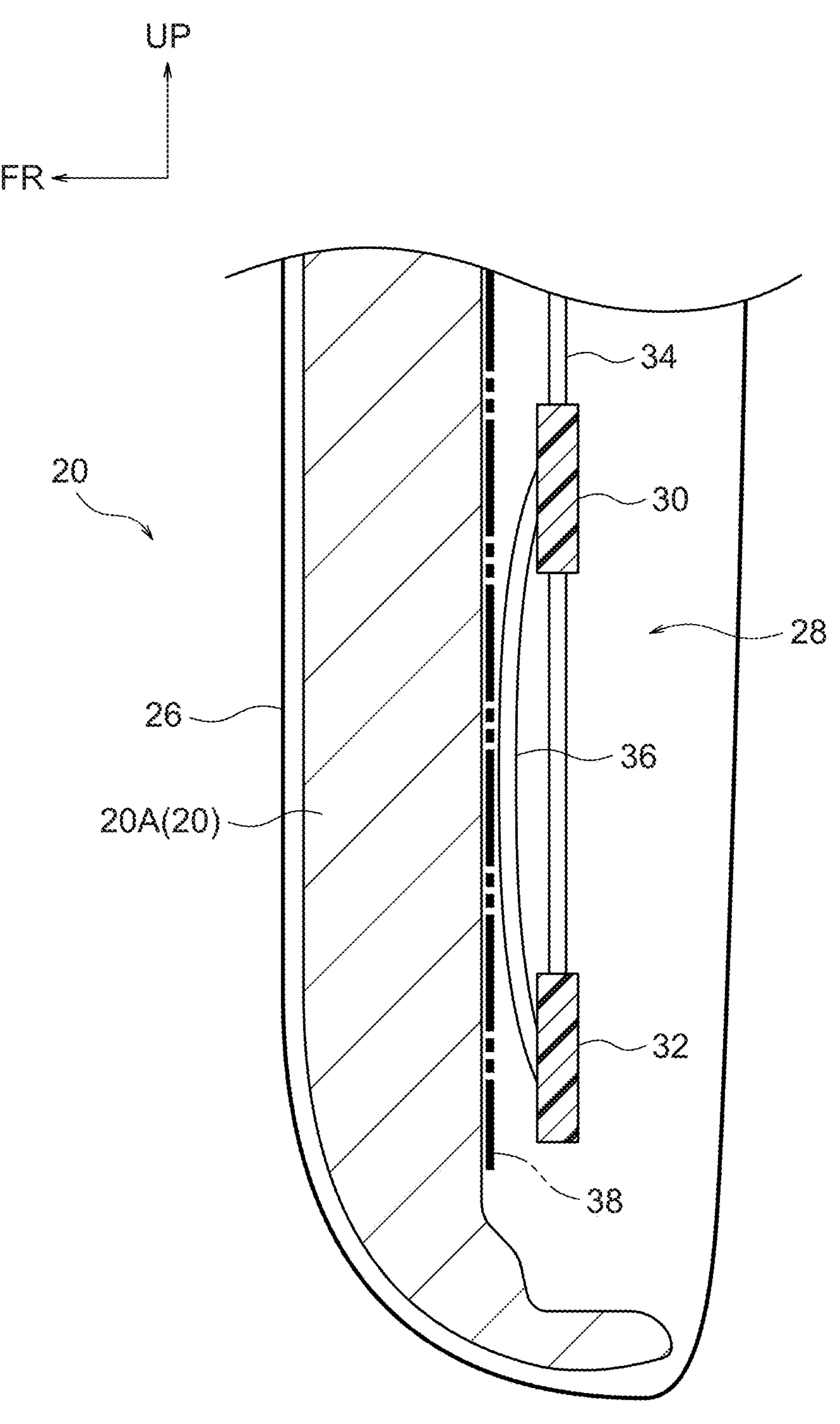
FIG. 6 is a vertical cross-section of a seatback pad according to a comparative example, and is a diagram corresponding to a section taken along line F6-F6 of FIG. 5.
Figure 7:
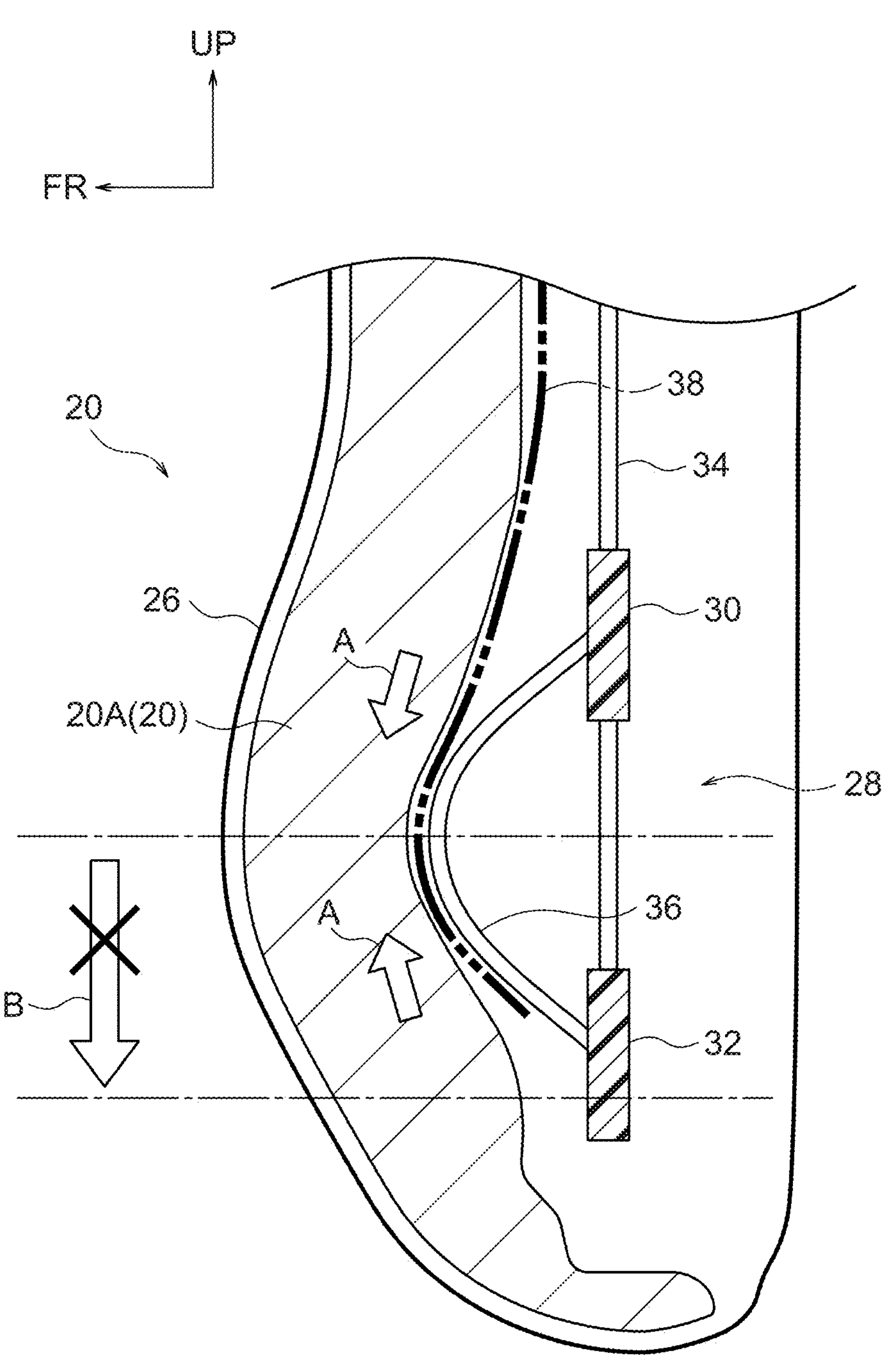
FIG. 7 is a cross-section corresponding to FIG. 6 illustrating a lower portion of a seatback pad according to a comparative example in a state pushed out by a lumbar support device.

Supplementary explanation will now be given regarding the above advantageous effects, using a comparative example illustrated in FIG. 5 to FIG. 7. This comparative example is configured similarly to the present exemplary embodiment, except in that plural grooves 24 are not formed in the seatback pad 20. The seatback pad 20 and the seatback cover 26 act as resistance when the lumbar support device 28 is operated in the comparative example, and the operational range (adjustment range) of the lumbar support device 28 is narrowed. Specifically, at a lower portion of the seatback pad 20 deformation of the pad main body section 20A is obstructed by excess thickness (see arrows A of FIG. 7) collecting at the back face side pressed by the lumbar support device 28, and so the seatback pad 20 is impeded from being pushed out toward the front. There is also a large deformation resistance of the seatback cover 26 at the lower end portion side of the seatback 14, and so a tendency for the operational range of the lumbar support device 28 to be narrowed is exacerbated. This means that even if the upper raising/lowering section 30, the lower raising/lowering section 32, and the left and right arch formed portions 36 are lowered by the raising/lowering mechanism, the support position of the lumbar region of the occupant by the seatback pad 20 is difficult to lower (displacing the lumbar support device 28 in the arrow B direction of FIG. 7 is difficult).

In contrast thereto, in the present exemplary embodiment the plural grooves 24 are formed in the lower portion of the back face of the seatback pad 20, and so when the lower portion of the seatback pad 20 is pushed out forward by the lumbar support device 28, there is less of the above described collection of excess thickness at the back face, and the deformation resistance of the seatback pad 20 is smaller. This facilitates deformation of the seatback pad 20, and enables the operational range of the lumbar support device 28 to be broadened downward (see arrow B of FIG. 4). As a result thereof, the support position of the lumbar region of the occupant by the seatback pad 20 can be sufficiently lowered, enabling an improvement to be made to the posture maintainability of the occupant.

Moreover, in the present exemplary embodiment, the plural grooves 24 formed in the lower portion of the back face of the seatback pad 20 are wider in up-down direction width on progression toward the rear side. The plural grooves 24 are thereby not liable to close when the lower portion of the seatback pad 20 is pushed out greatly toward the front side by the lumbar support device 28. As a result thereof, an advantageous effect of decreasing the deformation resistance of the seatback pad 20 is easily maintained.

Moreover, in the present exemplary embodiment, the seatback pad 20 includes the pad main body section 20A disposed at a left-right direction central portion of the seatback 14, and the left and right pad side sections 20B disposed at the left-right direction both side portions of the seatback 14. The left and right indentations 22 indented toward the front side are formed at the two left-right direction end portions of the lower portion of the back face of the pad main body section 20A. The two left-right direction end portions of the plural grooves 24 formed at the lower portion of the back face of the pad main body section 20A open onto the left and right indentations 22. This means that the deformation resistance of the pad main body section 20A when the lower portion of the pad main body section 20A is pushed out toward the front side by the lumbar support device 28 can be made small as far across as the two left-right direction end portions of the pad main body section 20A.

Note that although in the above exemplary embodiment the two left-right direction end portions of the plural grooves 24 are configured so as to open onto the left and right indentations 22, there is no limitation thereto, and a configuration may be adopted in which the left and right indentations 22 are not formed at the seatback pad 20.

Moreover, although in the above exemplary embodiment the up-down width of the plural (five) grooves 24 is configured so as to widen on progression toward the rear side, there is no limitation thereto, and the profile and number of the plural grooves 24 may be modified as appropriate.

In addition various modifications may be implemented within a range not departing from the spirit of the present disclosure. Moreover, obviously the scope of rights of the present disclosure is not limited by the above exemplary embodiment.

What is claimed is:

1. A seatback pad that configures a pad member of a seatback of a vehicle seat and that is covered by a cover, the seatback pad comprising:
- a plurality of grooves that extend along a seat left-right direction formed at a lower portion of a back face of the seatback pad facing toward a lumbar support device installed at the seatback, with the plurality of grooves being formed in a row along a seat up-down direction;
- a pad main body section disposed at a seat left-right direction central portion of the seatback;
- left and right pad side sections disposed at two seat left-right direction side portions of the seatback; and
- left and right indentations that are indented toward a seat front side and that are formed at two seat left-right direction end portions of the lower portion of the back face of the pad main body section,
- wherein the plurality of grooves is formed at the lower portion of the back face of the pad main body section with two seat left-right direction end portions of the plurality of grooves opening onto the left and right indentations.

2. The seatback pad of claim 1, wherein a seat up-down direction width of each of the plurality of grooves widens on progression toward a seat rear side.

3. A vehicle seat comprising:
- a seat cushion that is configured to be sat on by an occupant of a vehicle;
- a seatback that is configured to support a back of the occupant; and
- a lumbar support device installed at the seatback,
- wherein a pad member of the seatback is configured by the seatback pad of claim 1.

* * * * *